(12) United States Patent
Singhal et al.

(10) Patent No.: US 8,415,847 B2
(45) Date of Patent: Apr. 9, 2013

(54) INDUCTION MACHINE BEARING SYSTEM

(75) Inventors: Sumit Singhal, Cincinnati, OH (US); T. J. Stengel, Hamilton, OH (US)

(73) Assignee: Siemens Industry, Inc., Alpharetta, GA (US)

(\*) Notice: Subject to any disclaimer, the term of this patent is extended or adjusted under 35 U.S.C. 154(b) by 431 days.

(21) Appl. No.: 12/784,856

(22) Filed: May 21, 2010

(65) Prior Publication Data

US 2011/0285233 A1    Nov. 24, 2011

(51) Int. Cl.
*H02K 5/16* (2006.01)

(52) U.S. Cl. .......................................................... 310/90

(58) Field of Classification Search ................ 310/90, 310/90.5
See application file for complete search history.

(56) References Cited

U.S. PATENT DOCUMENTS

| | | | |
|---|---|---|---|
| 4,683,111 A | | 7/1987 | Helm |
| 4,982,126 A | \* | 1/1991 | Jolivet et al. ............. 310/90 |
| 5,027,280 A | \* | 6/1991 | Ando et al. ............. 700/174 |
| 5,193,953 A | \* | 3/1993 | Jesinger ............. 409/231 |
| 5,481,145 A | | 1/1996 | Canders |
| 5,739,607 A | \* | 4/1998 | Wood, III ............. 310/90.5 |
| RE36,101 E | | 2/1999 | Andres |
| 5,879,113 A | \* | 3/1999 | Ueyama et al. ............. 409/148 |
| 6,727,616 B1 | \* | 4/2004 | Gabrys et al. ............. 310/90.5 |
| 7,240,583 B2 | \* | 7/2007 | Wingett et al. ............. 74/573.13 |
| 7,264,430 B2 | \* | 9/2007 | Bischof et al. ............. 409/231 |

FOREIGN PATENT DOCUMENTS

| | | |
|---|---|---|
| DE | 4227663 A1 | 2/1994 |
| EP | 0315469 A2 | 5/1989 |
| GB | 2294299 A | 4/1996 |

OTHER PUBLICATIONS

PCT Search Report mailed Sep. 27, 2011 corresponding to PCT International Application No. PCT/US2011/036172 filed May 12, 2011 (12 pages).

\* cited by examiner

*Primary Examiner* — Nguyen N Hanh

(57) ABSTRACT

A bearing assembly for an induction machine, such as an alternating current motor, includes a magnetic bearing for supporting a rotating shaft. An auxiliary bearing, also supporting the shaft in the event of magnetic bearing failure, is aligned with the motor end shield and frame so that shaft loads supported thereby are transferred to the frame in a manner that reduces likelihood of magnetic bearing contact with the shaft or its deformation. The bearing assembly may incorporate shock absorbing and vibration damping/isolation elements, such as o-rings, between the auxiliary bearing and its support structure interface to the frame. The auxiliary bearing may be incorporated in a removable cartridge for ease of machine maintenance. The bearing assembly may include heat dissipating fins.

20 Claims, 6 Drawing Sheets

INDUCTION MACHINE BEARING SYSTEM

BACKGROUND OF THE DISCLOSURE

1. Field of the Invention

The invention relates to induction machine bearing systems, and more particularly to electric motor bearing systems including an active magnetic bearing and an auxiliary mechanical bearing, both supporting a rotatable shaft.

2. Description of the Prior Art

Induction machines, such as alternating current (AC) electric motors incorporate rotating shafts supported by bearings. Traditionally, motor bearings have included mechanical hydrostatic and hydrodynamic fluid film bearings and rolling element bearings.

In the more recent past, some induction machines have incorporated contactless magnetic bearings. An exemplary magnetic bearing is shown in U.S. Pat. No. 6,777,841. As is known in the art, magnetic bearings enable higher rotational speeds above traditional 50/60 Hz excitation frequencies, higher torque outputs and active shaft vibration damping: thereby enabling direct drive of compressors and other driven devices without the need for intermediate gear boxes that would otherwise provide variable speed or torque multiplication. It is desirable to dissipate heat generated within the region of the magnetic bearing (by the bearing itself or by the rest of the induction machine).

When magnetic bearings are employed in an induction machine, an auxiliary mechanical bearing system would be desirable in order to protect the magnetic bearing and the rest of the induction machine system in the event of magnetic bearing system failure or power failure. When such a failure occurs, the parallel mounted auxiliary bearings are intended to permit safe rundown of the induction machine equipment and reduce likelihood of damage to either the magnetic bearing or other machine structure. Upon magnetic bearing operational failure, motor shaft mechanical forces are transferred rapidly to the auxiliary bearing structure, causing potential impact shock to the magnetic bearing support structure as well as the auxiliary bearing. It is desirable to minimize potential damage to the induction machine that might be caused by such impact shock.

Mechanical bearings, including auxiliary bearings, often are serviced in accordance with a plant maintenance protocol. It is desirable to be able to service auxiliary bearings in as simple a fashion as is possible, with minimal time and effort.

Thus, a need exists in the art for an induction machine bearing system employing magnetic bearings that provides for: auxiliary bearings; bearing heat dissipation; reduction of potential impact shock to the magnetic bearing structure upon magnetic bearing failure; and ease of auxiliary bearing servicing.

SUMMARY OF THE INVENTION

Accordingly, an object of the invention is to provide an induction machine bearing system employing both magnetic and auxiliary bearings that enables bearing heat dissipation.

It is another independent object of the invention to provide an induction machine bearing system employing both magnetic and auxiliary bearings that reduces potential for impact shock to the magnetic bearing structure upon magnetic bearing failure, by transferring and/or such shock forces away from the magnetic bearing structure to other structural components within the machine.

It is yet another independent object of the invention to provide an induction machine bearing system employing both magnetic and auxiliary bearings that enables easy servicing of the auxiliary bearing.

These and other objects are achieved in accordance with the present invention by the induction machine bearing system of the present invention. A bearing assembly of the present invention, for an induction machine such as an alternating current motor, includes a bearing support collar coupled to the motor frame. The bearing support collar may include external fins for facilitating heat dissipation out of the bearing assembly. The bearing support collar includes magnetic bearing for supporting a rotating shaft. The bearing support collar also includes an auxiliary bearing, also supporting the shaft in the event of magnetic bearing failure. The auxiliary bearing is aligned with the motor end shield and frame so that shaft loads supported thereby are transferred to the frame in a manner that reduces likelihood of bearing support deformation that might lead to magnetic bearing contact with the shaft or magnetic bearing deformation. The bearing assembly may incorporate shock absorbing and vibration damping/isolation elements, such as o-rings, between the auxiliary bearing and its support structure. The auxiliary bearing may be incorporated in a removable cartridge for ease of maintenance.

The objects and inventive features of the present invention may be practiced individually or in any desired combination by those skilled in the art.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in induction machine bearing systems, including those for AC motors. While the present invention may be applied to various types of induction machines, the remainder of this description will focus on an exemplary application to AC motors.

Figure 1:
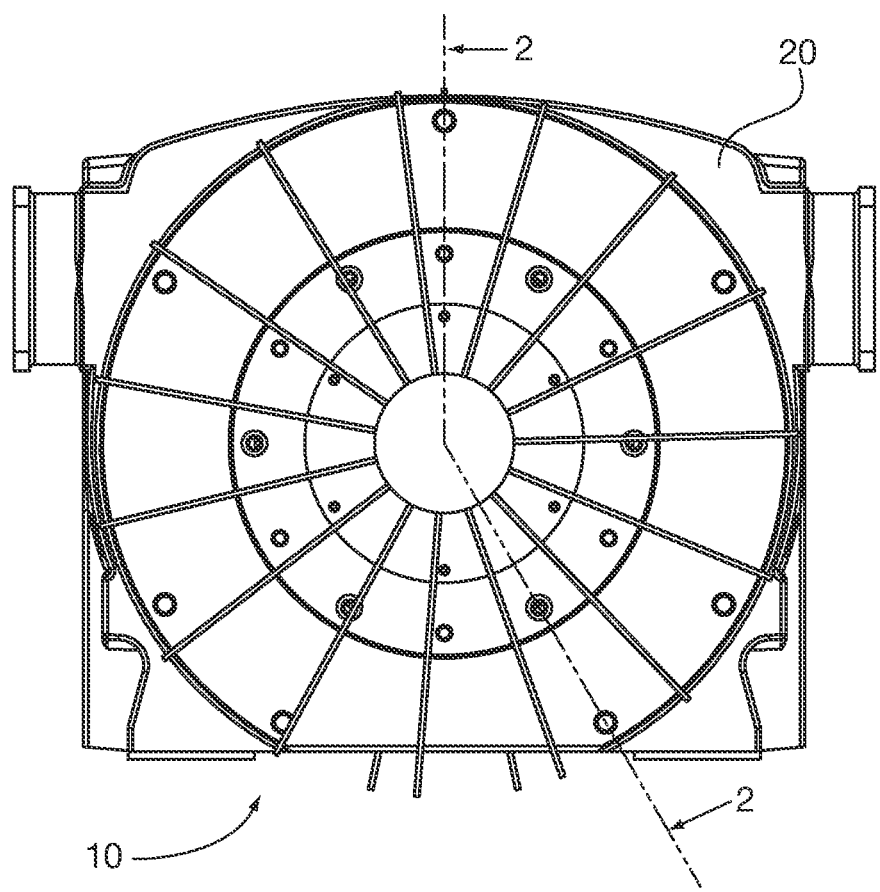
FIG. 1 shows an end elevational view of an exemplary induction machine AC motor incorporating the bearing system of the present invention.
Figure 2:
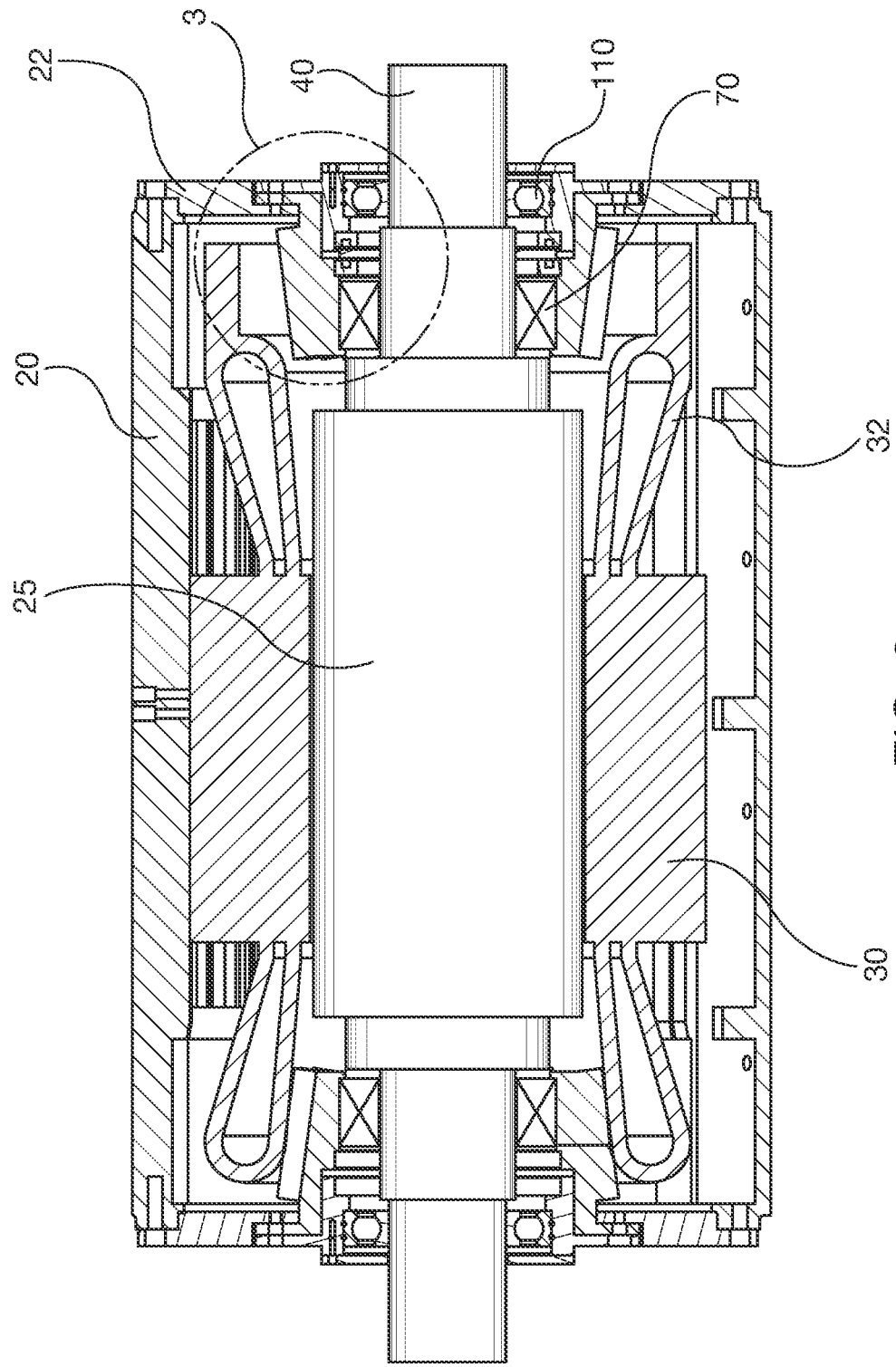
FIG. 2 is a partial axial sectional elevational view of the motor incorporating the bearing system of the present invention, taken along 2-2 of FIG. 1.

FIGS. 1 and 2 show generally an AC motor 10 having a motor frame 20 and a frame end shield 22. Electromotive mechanical work is generated by electromagnetic interaction of the rotor laminations 25 and stator coils 30, shown in an exemplary known squirrel cage configuration. The stator coils 30 have end coils 32, of known construction. Rotor laminations are coupled to shaft 40, all of known construction.

Shaft 40 is rotatively mounted in at least one or more bearing assemblies 50. Referring to FIGS. 3-6, the bearing assembly 50 has a bearing support collar 60 with a mounting flange 61 that is in turn fastened to the frame end shield 22. The support collar 60 outer surface may optionally define cooling fins 62 of any desired configuration, in order to enhance heat dissipation from the collar to cooling air flowing through the motor 10 inner cavity. The support collar 60 also has a magnetic bearing cavity 64 that receives magnetic bearing 70. It is intended that the magnetic bearing may be of any construction that is intended to orient the motor shaft 40 within an air gap free of contact with the remainder of the magnetic bearing 70 structure, and therefore is shown only in schematic form within the figures herein. During normal motor operation it is intended that the magnetic bearing 70 provide the primary support for transmitting shaft 40 load to the motor frame 20.

The bearing support collar 60 also receives a portion of thrust bearing assembly 80, also of known construction. The thrust bearing assembly 80 is intended to restrain axial movement of shaft 40 relative to the motor frame 20. More particularly, the thrust bearing assembly 80 includes an inner thrust bearing 82 that is received within the bearing support collar 60 inner thrust bearing cavity 66, and an outer thrust bearing 84 oriented in opposed spaced relationship from the inner thrust bearing. The respective thrust bearings 82, 84 capture a thrust bearing flange 86 between them that is in turn affixed to the shaft 40 in known fashion.

Magnetic bearing support collar 60 also defines an auxiliary bearing cartridge cavity 68 that in turn receives auxiliary bearing cartridge 90 in nested fashion. As is shown more clearly in FIGS. 3 and 7, the bearing cartridge 90 has a bearing cartridge mounting flange 91 that abuts the bearing collar flange 61. Both flanges 61 and 91 are nested within motor frame end shield 22.

Figure 7:
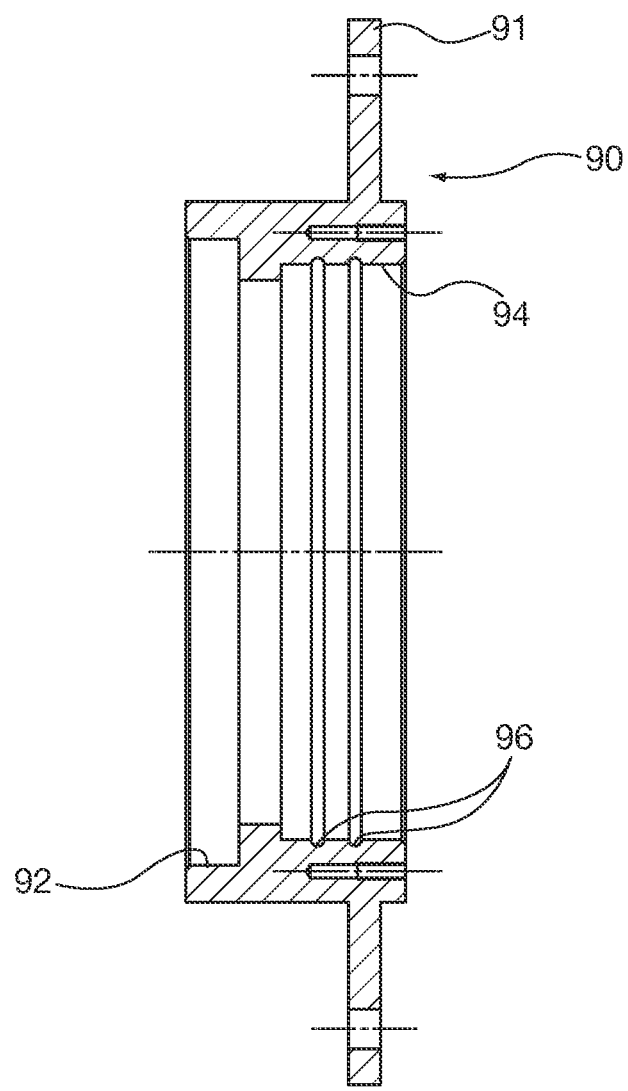
FIG. 7 is a cross-sectional elevational view of the auxiliary bearing cartridge of the present invention.

Referring to FIG. 7, the bearing cartridge 90 defines a thrust bearing cavity 92 for receipt of the outer thrust bearing 84. Auxiliary bearing cavity 94 receives auxiliary bearing 110. The auxiliary bearing 110 is of any known mechanical bearing construction, and is depicted as a rolling element bearing commonly used in electric motors. End cap 120 retains the auxiliary bearing 110 within the bearing cartridge 90.

Auxiliary bearing cavity 94 also defines o-ring recesses 96 that in turn receive the o-rings 100, that when assembled captures the o-rings between the bearing recesses 96 and an outer circumferential face of the auxiliary bearing 110. The o-rings 100 provide a sealing function between the auxiliary bearing 110 and the auxiliary bearing cavity recesses. The o-rings 100 also function as biasing elements between the auxiliary bearing 110 and the bearing cartridge 90, that may dampen and isolate vibration transmission from the rotating shaft 40 through the auxiliary bearing 110 from the rest of the motor frame 20 structure. In the event of a magnetic bearing 70 failure, the auxiliary bearing 110 must rapidly take up the shaft 40 support load formerly supported by the magnetic bearing. Rapid transfer of shaft 40 load support from the magnetic bearing 70 potentially creates a mechanical shock on the auxiliary bearing 110 and ultimately the motor frame 20. The biasing o-rings 100 may advantageously absorb, dissipate and dampen mechanical contact shock generated between the shaft 40/auxiliary bearing 110 and the frame end shield 22 frame 20, so as to reduce the likelihood of damage between the coupled auxiliary load support mechanical components.

Figure 3:
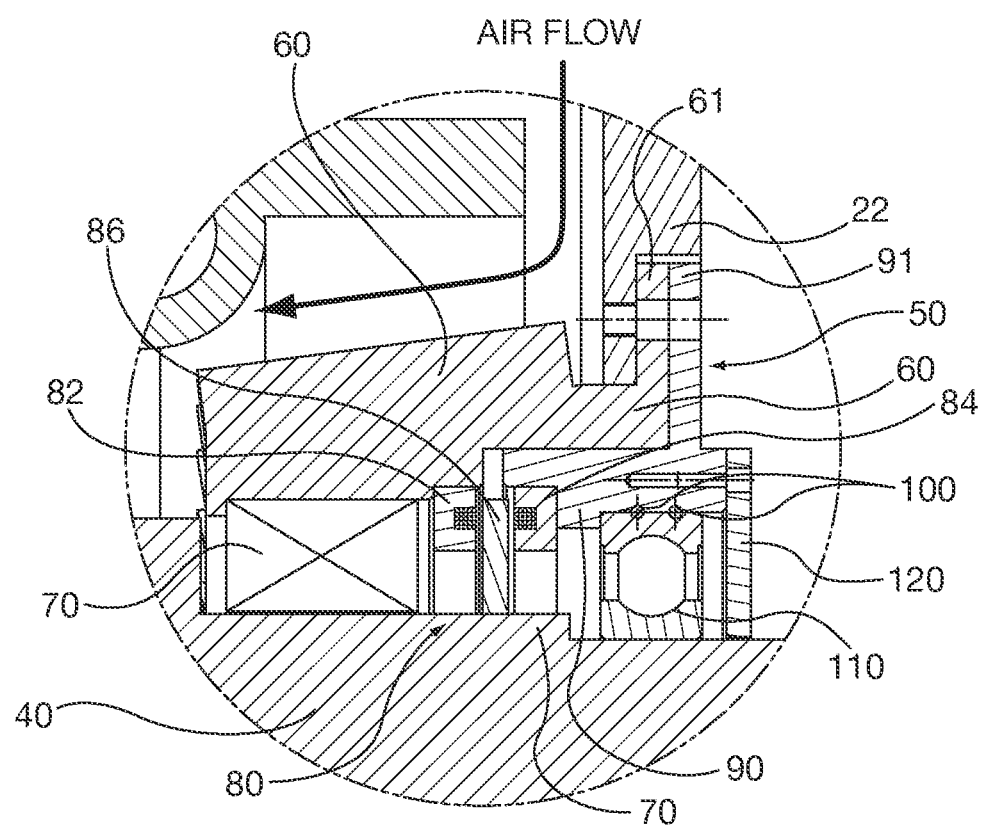
FIG. 3 is a detailed sectional view of FIG. 2.
Figure 4:
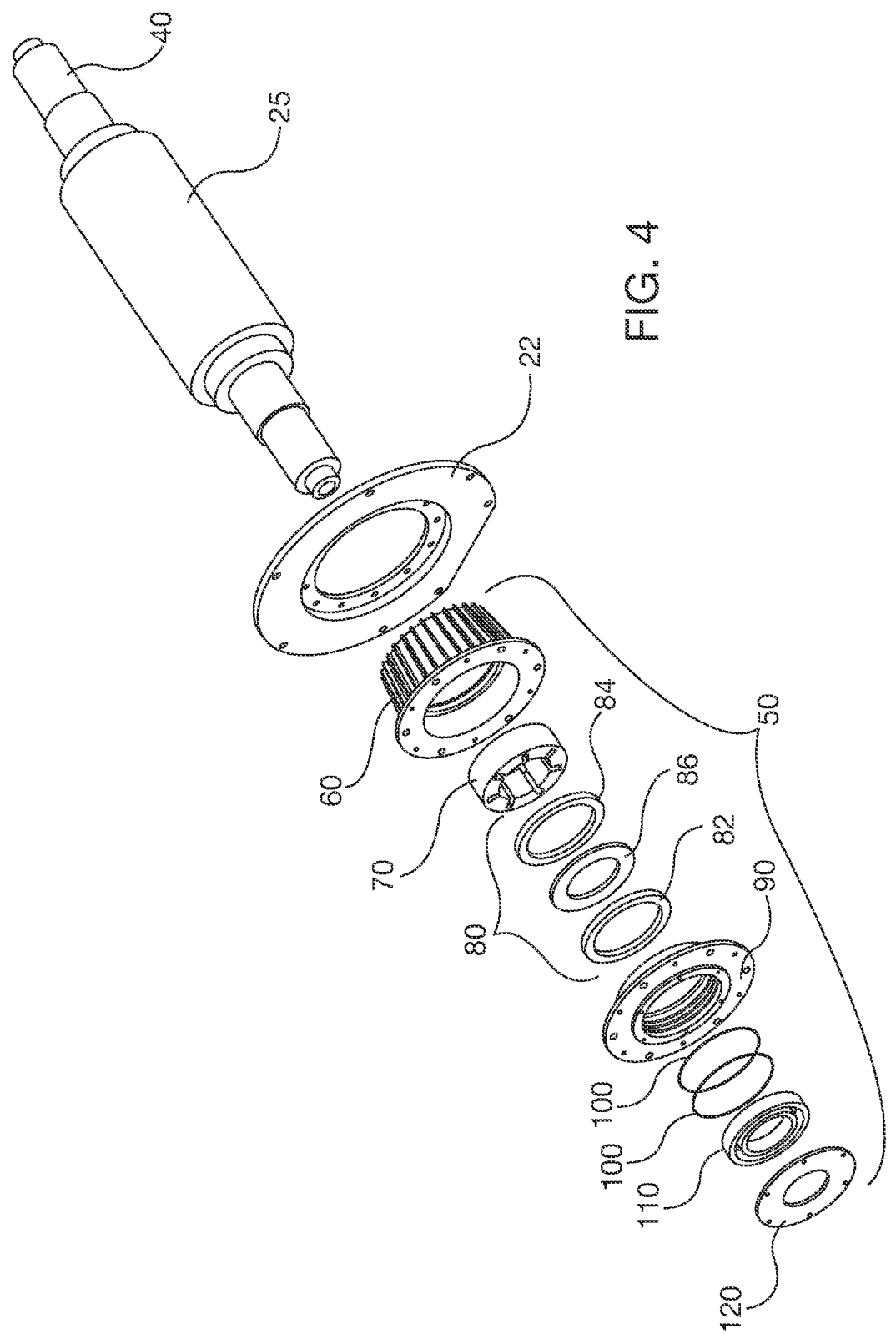
FIG. 4 is an exploded perspective view of the bearing system of the present invention.
Figure 5:
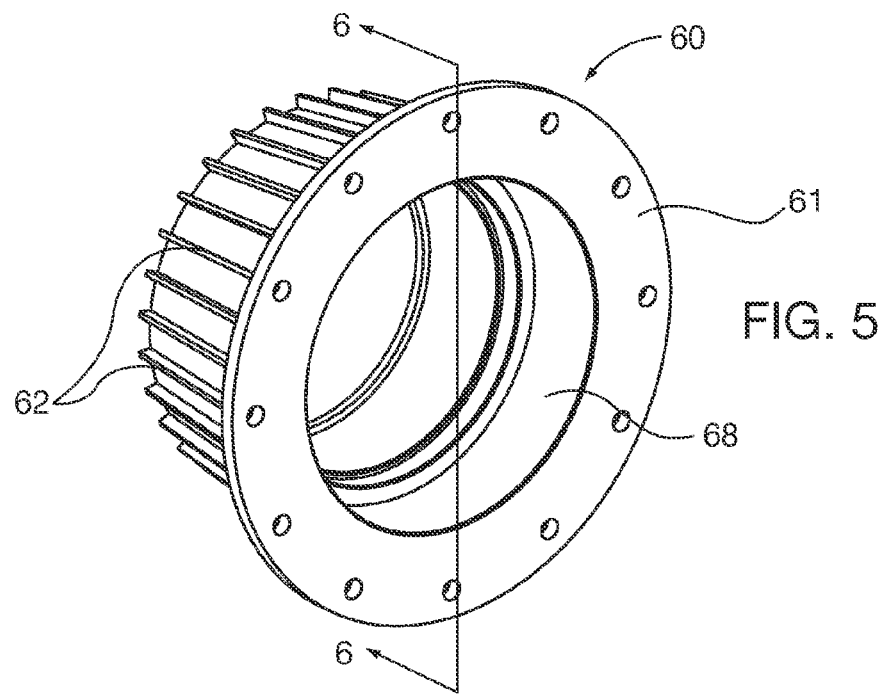
FIG. 5 is a perspective view of an exemplary magnetic bearing support collar of the present invention.
Figure 6:
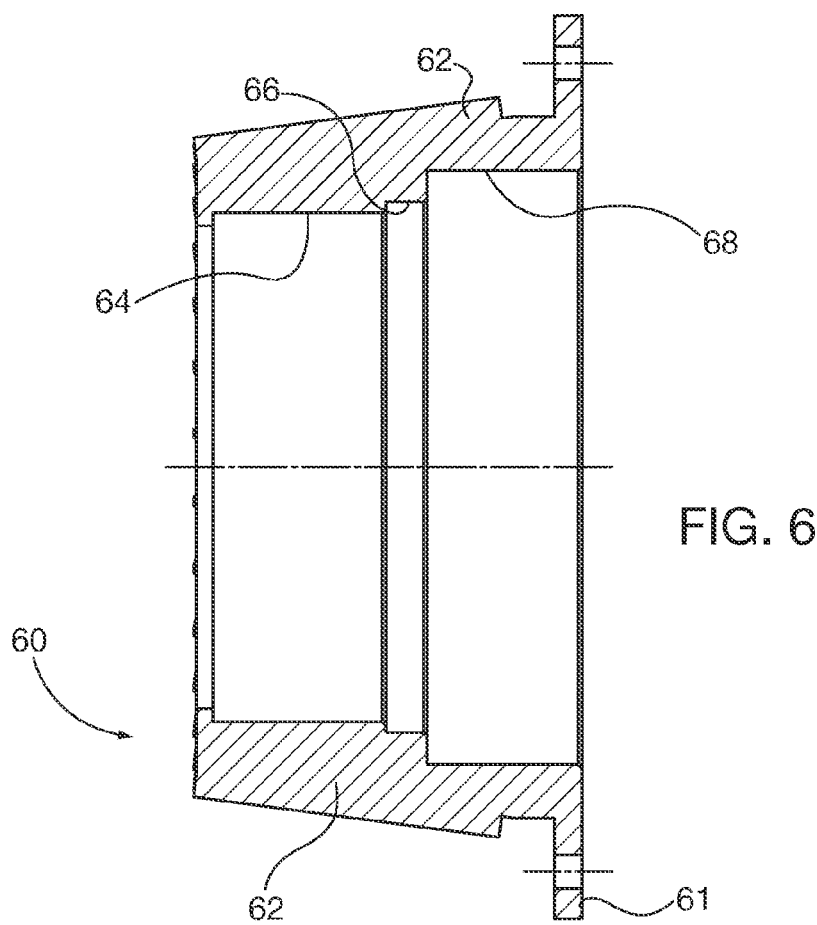
FIG. 6 is a cross-sectional elevational view of the magnetic bearing support collar of the present invention, taken along 6-6 of FIG. 5.

Preferably the bearing assembly 50 of the present invention is constructed to align the frame end shield 22 and auxiliary bearing 110 along the same axial plane, as shown in FIG. 3. In the event of magnetic bearing 70 failure, radially directed contact shock resulting from rapid transfer of shaft 40 support loads from the magnetic bearing to the auxiliary bearing 110 is transferred in a planar fashion to the relatively strong motor frame end shield 22 and frame 20. If the bearing 110 were axially offset from the frame end shield 22, support collar 60 flexure that might damage the magnetic bearing structure 70, if the latter were directly contacted by the shaft 40 or perhaps otherwise subject to deformational flexure along with the support collar. In the alternative to direct planar alignment of the bearing 110 and frame end shield 22, one skilled in the art may provide for axial offset so long as sufficient load supporting structure is added so that the support collar 60 does not deflect proximal the magnetic bearing 70 in a manner likely to cause magnetic bearing damage.

The support collar 60 further preferably has a generally tapered frusto-conical profile that is relatively stiffer proximal its mounting flange 61 to facilitate additional transfer of shock loads from the shaft 40 to the frame end shield 22/frame 20, via the auxiliary bearing 110 in the event of magnetic bearing 70 failure. One skilled in the art may incorporate selectively any one or more of the shock load dissipation features taught herein when practicing the present invention.

The generally frusto-conical outer profile of the support collar 60 also advantageously conserves open volume within the motor 10 cavity between the stator end turns 32, so as to provide for passage of cooling airflow, as shown in FIG. 3. Airflow generated by the spinning rotor and/or by known auxiliary fans (not shown) is directed into the motor cavity, where it contacts the cooling fins 62. Heat generated within the magnetic bearing 70 or conducted through the shaft 40 is transferred to the support collar 60 and thereafter propagates through the fins 62. The airflow carries heat out of the motor cavity to the surrounding environment.

Although various embodiments which incorporate the teachings of the present invention have been shown and described in detail herein, those skilled in the art can readily devise many other varied embodiments that still incorporate these teachings.

What is claimed is:

1. A bearing system for an induction machine comprising:
   a frame;
   a rotating shaft within the frame;
   a bearing support collar coupled to the frame and circumscribing at least a portion of the shaft therein, the bearing support collar including therein:
   heat dissipation fins formed thereon;
   a magnetic bearing for supporting the shaft; and
   an auxiliary bearing for supporting the shaft, the auxiliary bearing oriented in generally planar alignment with a portion of the frame so that shaft support load carried thereby is transferred to the frame without damaging the magnetic bearing.

2. The system of claim 1, further comprising a biasing element interposed between the bearing support collar and the auxiliary bearing.

3. The system of claim 1, further comprising a bearing cartridge retaining the auxiliary bearing therein, removable from the bearing support collar external the frame.

4. The system of claim 3, further comprising a biasing element interposed between the bearing cartridge and the auxiliary bearing.

5. The system of claim 4, wherein the biasing element comprises at least one o-ring.

6. The system of claim 1, further comprising a thrust bearing coupled to the bearing support collar intermediate the magnetic and auxiliary bearings.

7. The system of claim 6, further comprising a bearing cartridge retaining the auxiliary bearing therein, nested within a bearing cartridge cavity within the bearing support collar and restraining the thrust bearing there between.

8. The system of claim 1, further comprising a flange formed on the bearing support collar adapted for mating with a recess formed within the frame, the flange in generally planar axial alignment with at least a portion of the auxiliary bearing.

9. The system of claim 1, further comprising a biasing element interposed between the bearing cartridge and the auxiliary bearing.

10. The system of claim 9, wherein the biasing element comprises at least one o-ring.

11. A bearing system for an induction machine having a frame and a rotating shaft, comprising:
   a bearing support collar adapted for coupling to the frame and circumscribing at least a portion of the shaft therein, the bearing support collar including therein:
      a magnetic bearing adapted for supporting the shaft when the bearing support collar is coupled to the frame; and
      an auxiliary bearing cavity having nested therein a bearing cartridge removable from the bearing support collar external the frame, the bearing cartridge having therein an auxiliary bearing adapted for supporting the shaft when the bearing support collar is coupled to the frame, and when so coupled the auxiliary bearing adapted for generally planar alignment with a portion of the frame so that shaft support load carried thereby is transferred to the frame without damaging the magnetic bearing.

12. The system of claim 11, further comprising a thrust bearing coupled to the bearing support collar intermediate the magnetic and auxiliary bearings.

13. The system of claim 12, further comprising a bearing cartridge retaining the auxiliary bearing therein, nested within a bearing cartridge cavity within the bearing support collar and restraining the thrust bearing.

14. The system of claim 11, further comprising a flange formed on the bearing support collar adapted for mating with a recess formed within the frame, the flange in generally planar axial alignment with at least a portion of the auxiliary bearing.

15. The system of claim 11, further comprising heat dissipation fins formed on the bearing support collar.

16. A bearing system for an induction machine comprising:
   a frame;
   a rotating shaft within the frame;
   a bearing support collar coupled to the frame and circumscribing at least a portion of the shaft therein, the bearing support collar including therein:
      a magnetic bearing cavity having therein a magnetic bearing for supporting the shaft;
      a thrust bearing cavity having therein a thrust bearing for supporting the shaft; and
      an auxiliary bearing cavity having nested therein a bearing cartridge removable from the bearing support collar external the frame, the bearing cartridge having therein an auxiliary bearing for supporting the shaft, the auxiliary bearing oriented within the bearing cartridge in generally planar alignment with a portion of the frame, so that shaft support load carried thereby is transferred to the frame without damaging the magnetic bearing.

17. The system of claim 16, further comprising a biasing element interposed between the bearing cartridge and the auxiliary bearing.

18. The system of claim 16, further comprising a flange formed on the bearing support collar adapted for mating with a recess formed within the frame, the flange in generally planar axial alignment with at least a portion of the auxiliary bearing.

19. The system of claim 16, further comprising heat dissipation fins formed on the bearing support collar.

20. A bearing system for an induction machine having a frame and a rotating shaft, comprising:
   a bearing support collar adapted for coupling to the frame and circumscribing at least a portion of the shaft therein, the bearing support collar including therein:
      heat dissipation fins formed thereon;
      a magnetic bearing adapted for supporting the shaft when the bearing support collar is coupled to the frame; and
      an auxiliary bearing adapted for supporting the shaft when the bearing support collar is coupled to the frame, and when so coupled the auxiliary bearing adapted for generally planar alignment with a portion of the frame so that shaft support load carried thereby is transferred to the frame without damaging the magnetic bearing.

* * * * *